United States Patent [19]

Kashiwa et al.

[11] 4,071,674
[45] Jan. 31, 1978

[54] PROCESS FOR POLYMERIZATION OR COPOLYMERIZATION OF OLEFIN AND CATALYST COMPOSITIONS USED THEREFOR

[75] Inventors: Norio Kashiwa, Iwakuni; Saburo Fuji, Otake; Masahide Tanaka, Iwakuni, all of Japan

[73] Assignee: Mitsui Petrochemical Industries Ltd., Tokyo, Japan

[21] Appl. No.: 672,067

[22] Filed: Mar. 30, 1976

Related U.S. Application Data

[63] Continuation of Ser. No. 396,137, Sept. 11, 1973, abandoned.

[30] Foreign Application Priority Data

Sept. 14, 1972 Japan ................................ 47-91807
Mar. 20, 1973 Japan ................................ 48-31382

[51] Int. Cl.$^2$ .......................... C08F 4/02; C08F 10/02
[52] U.S. Cl. ............................. 526/125; 252/429 B; 252/429 C; 526/124; 526/339; 526/348.6; 526/309; 526/352; 526/284

[58] Field of Search ........................................ 526/125

[56] References Cited

U.S. PATENT DOCUMENTS

| 3,642,746 | 2/1972 | Kashiwa et al. | 526/125 |
|---|---|---|---|
| 3,718,636 | 2/1973 | Stevens et al. | 526/124 |
| 3,745,154 | 7/1973 | Kashiwa | 526/124 |
| 3,803,105 | 4/1974 | Galli et al. | 526/125 |
| 3,830,787 | 8/1974 | Susa et al. | 526/125 |

*Primary Examiner*—Edward J. Smith
*Attorney, Agent, or Firm*—Sherman & Shalloway

[57] ABSTRACT

Olefins are polymerized with superior activity, using a catalyst composition consisting essentially of (a) a transition metal catalyst component prepared by reacting a titanium or vanadium compound with the reaction product formed between an alcohol-adduct of a magnesium dihalide solid carrier and an organometallic compound or a metal of groups I to III of the periodic table, and (b) an organometallic compound catalyst component of a metal of Groups I to III of the periodic table.

10 Claims, No Drawings

PROCESS FOR POLYMERIZATION OR COPOLYMERIZATION OF OLEFIN AND CATALYST COMPOSITIONS USED THEREFOR

This is a continuation, of application Ser. No. 396,137, filed Sept. 11, 1973, now abandoned.

This invention relates to an improved process for polymerizing or copolymerizing an olefin with commercial advantage and good quality reproducibility using a new catalyst composition which exhibits improved high activity, is capable of giving a polymer of a proper particle size and a narrow particle size distribution, and permits easy control of the melt index of the resulting polymer.

Previously, British Patent 1,256,851 (U.S. Pat. No. 3,718,636) proposed the use of, as a transition metal catalyst component capable of giving a polyolefin of a wide molecular weight distribution, a solid reaction product obtained by reacting a solid carrier composed of a compound of a divalent metal including magnesium, especially a hydroxyhalide, partially hydroxylated halide, oxide, complex oxide, complex hydroxide, alcoholate, inorganic oxyacid salt, or mono- or polycarboxylic acid salt, with an organoaluminum compound or organomagnesium compound, then separating the resulting solid reaction product from the reaction product system, further reacting the separated solid reaction product with a transition metal compound in the absence of a liquid diluent, and thereafter removing the final solid product from the system. In this patent, it is essential to separate the solid reaction product from the product obtained by the reaction of the carrier with the organometal compound. It is further required that the separated solid reaction product be washed with an inert solvent and then dried, and the reaction of this product with a transition metal compound be carried out in the absence of even a trace of a diluent. As a result, the procedure of preparing the catalyst component has the disadvantage that the finely divided solid is separated and washed without bringing it into contact with air or moisture, and then dried completely.

Prior to the above-described attempts, it was proposed in British Patent 927,969 to provide a polyolefin, especially polypropylene, having excellent stereospecificity by the vapor phase polymerization method utilizing as a catalyst component a reaction product which is obtained by reacting a solid carrier composed, for example, of $CaCO_3$, $CaCl_2$ or $NaCl$ with an organometallic compound, and then reacting the resulting reaction product with a transition metal compound. In this proposal, it is essential to heat-treat the above catalyst component, and if this heat-treatment is omitted, the resulting catalyst component cannot give polymers of increased stereospecificity. In addition, the catalyst obtained in this proposal has very poor activity.

We have made investigations about improved catalysts very suitable for polymerizing or copolymerizing an olefin, and found that catalysts which have improved high activity, are capable of giving polymers of proper particle size, a narrow particle size distribution, and permit easy control of the melt index of the resulting polymer, can be prepared without the need for the above mentioned complicated and careful control or the heat-treatment of the catalyst component in the above-mentioned prior proposals. It has been found that this improvement can be accomplished by using an alcohol-adduct of magnesium dihalide as the solid carrier.

Accordingly, an object of this invention is to provide an improved process for polymerizing or copolymerizing an olefin.

Another object of this invention is to provide a catalyst composition for use in the above-mentioned process.

Many other objects of this invention along with its advantages will become more apparent from the following description.

According to the process of this invention, an olefin is polymerized, or the olefin and other olefin and/or diolefin are copolymerized in the presence of a catalyst composed of (a) a transition metal catalyst component obtained by reacting a solid carrier consisting of an alcohol-adduct of magnesium dihalide with an organometallic compound of a metal of groups I to III of the periodic table and then reacting the reaction product with a titanium or vanadium compound, and (b) an organometallic compound of a metal of Groups I to III of the periodic table.

The present invention is effective for ethylene and propylene, especially for the polymerization of ethylene and the copolymerization of ethylene with an α-olefin and/or diolefin.

The process of the present invention makes it possible to provide polymers suitable for the desired uses, ranging from those having a wide molecular weight distribution suitable for blow molding to those having a narrow molecular weight distribution. In addition, the process of this invention brings about the following advantages.

(a) Since the yield of polymer per unit amount of transition metal atom and per unit amount of solid catalyst component is very high it is totally unnecessary to remove the catalyst residue from the resulting polymer.

(b) Polymers having a suitable particle size and a narrow particle size distribution and a high apparent density can be obtained with good reproducibility, and there is hardly any formation of polymers in the form of coarse or ultrafine particles. Thus, it is possible to operate the polymerization process continuously over a markedly extended period of time.

(c) Since the molecular weight of the polymer can be effectively controlled even when the partial pressure of hydrogen used as a chain transfer agent is low, it is easy to produce polyethylene wax which is a low molecular weight polymer, or polymers of relatively low molecular weight for high speed injection molding.

(d) Copolymerization of ethylene, especially with a diolefin such as butadiene, can be performed with very high catalyst activity, and polymers having great quantities of double bonds in the molecules can be easily produced. These highly unsaturated polymers are valuable because they can be easily modified by a graft reaction or high molecular reaction.

(e) The solid catalyst component can be prepared easily.

While the conventional catalysts have one or more of these advantages separately, it should be understood that the catalyst composition of this invention possesses all of these advantages in combination.

Because if the advantage (a) of high catalytic activity, the amount of the catalyst can be very much reduced. Thus, the resulting polymer contains a markedly reduced amount of titanium or halogen which may cause poor color of the polymer, or the blockage or corrosion of the molding machine. The removal of the catalyst from the polymer can be omitted without any consequent trouble, and this can lead to a drastic reduction in the cost of production.

The advantage (b) is the outcome of the fact that by the catalyst of this invention, polymers of high apparent density and uniform particle size distribution can be produced. In the conventional methods, the polymer tends to adhere to the wall of the polymerization vessel, and the coarse particles of the resulting polymer sediment in the polymer extracting pipe of the polymerization vessel, which is likely to cause difficulty of discharging the polymer slurry. This was the greatest difficulty of continuous polymerization. Once such a situation is involved, undesirable accidents such as the failure of uniform stirring with the polymerization vessel or the melting of the polymer as a result of heat build-up, inevitably end in stopping the polymerization. Such a difficulty can be avoided by the process of this invention.

As regards the advantage (c), the present invention makes it easy to produce polymers of the desired low molecular weight by using a very small amount (low particle pressure) of hydrogen and a small amount of the catalyst. The catalyst of this invention has the property of inducing an efficient addition of hydrogen to the polymer, and moreover, by selecting the partial pressure of hydrogen, the molecular weight of the polymer can be easily controlled within a wide range. With the conventional catalysts, the partial pressure of hydrogen should be elevated considerably if it is desired to obtain polymers of sufficiently low molecular weights, and in order to make up for the consequent reduction in polymerization activity, there is no alternative but to increase the amount of the catalyst. In addition, the molecular weight can be controlled by hydrogen only within a narrow range.

One example of the advantage (d) is that highly unsaturated polyethylene containing a large amount of a diolefin such as butadiene can be produced in good yield using the catalyst of this invention. For example, polyethylene containing about 20 double bonds per 1000 carbon atoms can be easily obtained. Many of the conventional Ziegler type catalysts do not exhibit high activity in a system in which a diolefin is copresent, and the diolefin can be included into the copolymer only in a small amount.

As the advantage (e), the procedure of catalyst preparation can be simplified greatly as compared with the prior art techniques. In the prior art attempts, such operations as the separation, washing and drying of the finely divided compound are essential in catalyst preparation. Since these operations are performed on the finely divided compound, they require a very long time, and there is a great loss of the final product because of the need for these operations. Furthermore, in the conventional processes, the amount of the transition metal compound which is used for catalyst preparation but not deposited on a support is very large as compared with the amount of the compound deposited on the support and used as catalyst. Such a transition metal compound must be removed as much as possible by washing, for example. The transition metal compound used in excess contains by-products formed during the catalyst preparation, and also includes the inert solvent used for washing. Thus, the separation and re-purification of this compound require great time and cost.

On the other hand, in the preparation of the catalyst of this invention, the separation, washing, drying, etc. of the reaction product are not essential throughout the catalyst preparation. Thus, the operation and apparatus are very much simplified, and the time required for catalyst preparation is very much shortened. It is possible to avoid complicated and costly procedures such as the discarding or regeneration of the by-products.

The solid carrier used in this invention is a carrier in which an alcohol is coordinated with a magnesium dihalide, preferably magnesium dichloride. The properties of the resulting catalyst can be varied somewhat according to the type and amount of the alcohol. Generally, it is recommended that the amount of the alcohol to be added is 0.1 to 10 mols per mol of the magnesium dihalide. In order to prepare a titanium catalyst component constituting a catalyst system which has high activity and permits the omission of treating the catalyst residue after polymerization: the alcohol is used preferably at least 6 mols, per mol of the magnesium dihalide.

Usually, the magnesium dihalide is used in the anhydrous form. The term "anhydrous," used herein, does not exclude the use of reagent grade compounds commercially available under the designation "anhydrous," which contain a very small amount of moisture.

If the amount of the alcohol is too small, the polymerization activity of the catalyst per unit amount of the titanium or vanadium atom is low, and the resulting catalyst gives polymers in the form of coarse or ultrafine particles with a non-uniform particle size distribution. As a result of pretreatment with alcohols, the particles of the magnesium dihalide are more finely divided than before the treatment, and an infrared absorption spectroscopic analysis and an X-ray analysis of the product shows that it is converted to an adduct of the magnesium dihalide and the alcohol. The reaction of the magnesium dihalide carrier with the alcohol is generally carried out at a temperature of $-10°$ C. to $+200°$ C. The reaction proceeds satisfactorily at room temperature. Most usually, the reaction temperature is from $0°$ C. to $100°$ C. preferably $10°$ C. to $60°$ C. The reaction time is generally 10 minutes to 2 hours. The reaction is preferably carried out in the absence of water and molecular oxygen. Usually, it is performed in an atmosphere of nitrogen in an inert organic medium. Examples of the medium may be those utilized for polymerization, and include hexane, heptane, kerosene, benzene, xylene, and fluorobenzene.

The alcohol-adduct magnesium dihalide is produced by conventional methods. For example, it can be prepared by reacting metallic magnesium with ethanol containing dry hydrochloric acid to form $MgCl_2 \cdot 6EtOH$ [Russian Journal of Inorganic Chemistry, vol. 12, No. 6, 901 (1967)].

The resulting alcohol-adduct of magnesium dihalide is then reacted with an organometallic compound of a metal of Groups I to III of the periodic table. At this time, it is not necessary to separate the adduct, but rather the organometal compound can be added to the reaction product system containing the adduct. The reaction is preferably carried out in the absence of water and molecular oxygen in the same way as above. The reaction temperature is, for example, $-20°$ C. to 100 C., preferably $20°$ C to $40°$ C. It is sufficient that the reaction time is about 10 minutes to 4 hours. Usually, the organometal compound is used in an amount of at least 0.1 mol per mol of the alcohol-adduct of magnesium. It is not necessary to use it in a large amount, but usually, amounts of 0.5 to 10 mols suffice. Especially when it is desired to prepare a catalyst having high activity and being suitable for continuous polymerization for long periods of time, the organometal compound is used in an amount such that the amount of the organic groups of the organometal compound is 0.1 to 1.5 mols, preferably 0.5 to 1 mol, per mol of the alcoholic hydroxy group of the alcohol-adduct of magnesium dihalide.

If the amount of the organic groups of the organometal compound is small as compared with the amount of the hydroxy groups of the alcohol at the time of reacting the alcohol-adduct of magnesium dihalide with the organometal compound, the resulting catalyst is not suitable for continuous slurry polymerization for prolonged periods of time. Accordingly, it is preferred that the amount of the organic groups be selected experimentally within the above-specified range according to the type of the alcohol added and the organometallic compound to be reacted with the adduct. According to the X-ray analysis of the solid portion of the reaction product formed between the alcohol-adduct of magnesium dihalide and the organometallic compound, it shows a diffraction pattern based on unknown crystals which are neither crystals of the magnesium dihalide nor those of the alcohol-adduct.

The reaction formed between the alcohol-adduct of magnesium dihalide and the organometallic compound of a metal of Groups I to II of the periodic table may be directly reacted with a titanium or vanadium compound to form the transition metal catalyst component (a), although it is possible to separate the solid portion from the reaction product before reaction with the titanium of vanadium compound. The molar ratio of the organometallic compound to the titanium or vanadium compound is about 1:0.1 to 10, and commercially advantageously, 1:0.1 to 5. Generally, this reaction is carried out at a temperature of $-50°$ C. to $+250°$ C. for 10 minutes to 5 hours. The reaction proceeds satisfactorily even at room temperature, but it may be carried out at an elevated temperature. Preferably, the reaction is carried out in the presence of an inert solvent such as a hydrocarbon or a halogenated hydrocarbon under conventional agitation or with mechanical pulverization using a ball mill. At the end of the reaction, a product insoluble in hydrocarbon is formed. The prodduct may be separated from the hydrocarbon-soluble substance by such means as filtration, decantation or other suitable solid-liquid separating means. In most cases, however, this procedure is not required. The catalyst component (a) so obtained can be utilized as such without particularly subjecting it to heat treatment.

Preferred examples of the alcohols used for producing the alcohol-adduct of magnesium dihalide carrier are aliphatic and aromatic alcohols having up to 12 carbon atoms, which may be used either alone or in combination.

Specific examples of the alcohols are saturated aliphatic alcohols such as methyl alcohol, ethyl alcohol, propyl alcohol, isopropyl alcohol, butyl alcohol, or octyl alcohol; unsaturated aliphatic alcohols such as allyl, alcohol or undecyl alcohol; aliphatic polyhydric alcohol such as ethylene glycol, glycerol or propylene glycol; carbitols such as butyl carbitol; and aromatic alcohols such as benzyl alcohol.

Preferably, the organometallic compound of a metal of Groups I to III of the periodic table used for reaction with the alcohol-adduct of magnesium dihalide carrier may, for example, be compounds of the formula RM wherein R is an alkyl or aryl group, and M is lithium, sodium or potassium, compounds of the formula $R_2M'$ wherein R is the same as defined above and M' is zinc or cadmium, compounds of the formula $R_{2-l}MgX_l$ wherein R is the same as defined above, X is a halogen atom and $l$ is 0 or 1, compounds of formula $MAlR_4$ wherein R and M are the same as defined above, compounds of the formula $R'_{3-m}AlX_m$ wherein R' is a hydrogen atom, or an alkyl or aryl group, X is the same as defined above, and $m$ is 0 or a positive number of not greater than 3, compounds of the formula $R'_{3-n}Al(OR)_n$ wherein R' is the same as defined above, and $n$ is a positive number greater than 0 but not greater than 3, and compounds of the formula $RAl(OR)X$ wherein R and X are the same as defined above.

If there are two more R, R' and X in each of the above formula, they may be the same or different. Preferred alkyl groups represented by R or R' contain 1 to 12 carbon atoms, and preferred aryl groups represented by R or R' are phenyl and benzyl groups. X is preferably chlorine or bromine. Of the organometal compounds exemplified above, organoaluminum compounds are especially preferred, particularly those of the formula $R'_{3-m}AlX_m$.

Examples of the titanium or vanadium compound are compounds of the formula $TiX_4$ wherein X is a halogen atom, compounds of the formula $Ti(OR)_{4-n}X_n$ wherein X is the same as defined above, R is an alkyl group, preferably those containing 1 to 12 carbon atoms, $n$ is 0 or a positive number less than 4, compounds of the formula $VOX_3$ wherein X is the same as defined above, and compounds of the formula $VX_4$ wherein X is the same as defined above. The titanium compounds are preferred, and especially the compounds of the formula $TiX_4$, above all titanium tetrachloride, are preferred.

In the present invention, there is used a catalyst composed of a transition metal catalyst component described above and an organometallic compound component of a metal of Groups I to III of the periodic table. The magnesium dihalide carrier is reacted with the alcohol to form the adduct, which is then reacted with the organometallic compound of a metal of Groups I to III of the periodic table. The reaction product is then reacted with the titanium or vanadium compound to form the transition metal catalyst component. The resulting transition metal catalyst component is further reacted with the organometallic compound catalyst component to form the catalyst of this invention.

The organo metal compound catalyst component to be combined with the transition metal catalyst component may be the same, but not necessarily, as those used for reaction with the alcohol-adduct of magnesium dihalide. The preferred organometallic compound catalyst component (b) are the compounds of formula $R'_{3-m}AlX_m$ wherein R' is a hydrogen atom, an alkyl or aryl group, X is a halogen atom, and $m$ is 0 or a positive number not greater than 3, the compounds of formula $R'_{3-n}Al(OR)_n$ wherein R' is the same as mentioned above, and $n$ is a positive number greater than 0 but not greater than 3, the compounds of formula $R_{2-l}MgX_l$ wherein R and X are the same as defined above and $l$ is 0 or 1, and dialkyl zincs. Examples are trialkyl aluminums, alkyl aluminum halides, alkyl aluminum hydrides, dialkyl zincs, dialkyl magnesiums, and alkyl magnesium halides. Specific examples include triethyl aluminum, diethyl aluminum hydride, tripropyl aluminum, tributyl aluminum, diethyl aluminum chloride, diethyl aluminum bromide, diethyl aluminum ethoxide, diethyl aluminum phenoxide, ethyl aluminum ethoxychloride, and ethyl aluminum sesquichloride. Of these, the trialkyl aluminum such as triethyl aluminum, or tributyl aluminum, the dialkyl aluminum hydrides such as diisobutyl aluminum hydride, and the dialkyl aluminum halides such as diethyl aluminumchloride are preferred.

The polymerization of olefins using the catalyst of this invention is preferably carried out in an inert medium. The amount of the transition metal catalyst component is preferably 0.001 to 100 millimols calculated as the titanium atom per liter of the inert liquid medium. The amount of the organometallic compound (b) of a metal of Groups I to III of the periodic table is preferably at least 0.1 mol, more preferably 1 to 10,000 mols per mol of the titanium or vanadium atom of the titanium or vanadium compound.

The olefin polymerizing reaction using the catalyst of this invention can be performed in the same way as in the case of olefin polymerization using the conventional Ziegler-type catalysts. The reaction is carried out in the substantial absence of oxygen and water. A suitable inert organic liquid medium, for example, an aliphatic hydrocarbon such as hexane, heptane or kerosene, is used, and an olefin and the catalyst, and if desired, another olefin and/or diolefin are fed into the medium and the polymerization is carried out.

When ethylene is polymerized with the catalyst composition of this invention in the presence of hydrogen, the presence of hydrogen in a low concentration contributes to the reduction of the molecular weight, and the molecular weight distribution can be effectively broadened. The partial pressure of hydrogen in the polymerization system can be varied from 1 to 99% of the total pressure, as required. Hydrogen may be added at the initial stage of ethylene polymerization, or ethylene and hydrogen may be added simultaneously. If desired, hydrogen can be fed into the reaction system intermittently. The polymerization temperature is usually 20° to 200° C., preferably 50° to 180° C. Generally, the reaction is carried out at a pressure of 1 to 100 Kg/cm$^2$. Preferably, the reaction is performed at an elevated pressure. The control of the molecular weight distribution by the conjoint use of the catalyst composition of this invention and hydrogen is effective not only for the batch-wise method, but also to continuous polymerization of ethylene. In the polymerization or copolymerization of ethylene with the catalyst system of this invention, the molecular weight of the polymer can be controlled to some extent by varying the polymerization conditions such as the polymerization temperature or the molar ratio of the catalyst, but the addition of hydrogen to the polymerization system is most effective. Even at a low partial pressure of hydrogen, the molecular weight reduction is sufficient. Furthermore, the molecular weight can be controlled over a wide range, and polymers having a molecular weight of as low as several hundred to several thousand can be easily obtained with high catalyst efficiency. This is a very outstanding feature of the catalyst composition of this invention in view of the fact that the conventional catalyst systems have difficulty of giving such low molecular weight polymers.

Examples of the α-olefin or diolefin to be copolymerized with ethylene are propylene, butene-1, hexene-1, 4-methylpentene-1, octent-1, butadiene, isoprene, ethylidenenorbornene, dicyclopentadiene and 1,4-hexadiene. The increase in the yield of polymer and in the apparent density of the polymer, etc. may be attempted by adding various additives used for polymerization reaction catalyzed by the conventional Ziegler-type catalysts, for example, by adding a polysiloxane or an ester to the polymerization system.

The following Examples illustrate the present invention, in which the reaction system was shilded from oxygen and moisture from the beginning to the the end of polymerization.

EXAMPLE 1

Preparation of catalyst 953 g (10 mols) of commercially available anhydrous magnesium dichloride was suspended in 10 liters of hexane, and 60 mols of ethyl alcohol was added dropwise at room temperature over a period of 30 minutes. After the end of addition, the solution was stirred for 30 minutes at room temperature. The product was identified by an X-ray analysis as the same as the crystals of $MgCl_2.6EtOH$. While maintaining the reaction system at a temperature of not more than 40° C., 31 mols of diethyl aluminum chloride was added dropwise, and the mixture was stirred for 30 minutes to form a crystalline compound which was neither $MgCl_2$ nor $MgCl_2.6EtOH$. Then, 5 mols of titanium tetrachloride was added, and the mixture was stirred for 6 hours at 30° C. The catalyst as obtained was ready for use in polymerization.

Polymerization (1) A 2-liter autoclave was charged with 1 liter of kerosene, 0.4 millimols of triethylaluminum, and 0.0025 millimols, calculated as titanium metal, of the above titanium catalyst. The reaction system was heated to 80° C. Hydrogen was introduced into the autoclave to a partial pressure of 3 Kg/cm$^2$, and ethylene was introduced continuously so as to maintain the total pressure ot 7 Kg/cm$^2$, and polymerized for one hour to afford 156 g of polyethylene having an apparent density of 0.32 g/cm$^3$ and a melt index of 8.9.

The catalyst activity was 62,400 g polymer/mmol Ti.hr which corresponded to 312,000 g polymer/g Ti.hr. ethylene atm. An X-ray analysis showed that the polymer contained 0.5 ppm of titanium and 7 ppm of chlorine. The particle size distribution of the polymer was as follows:

| Particle size (mesh) | Greater than 42 | 42–60 | 60–100 | 100–150 | 150–200 | Smaller than 200 |
|---|---|---|---|---|---|---|
| Distribution (wt.%) | 1.8 | 12.0 | 51.2 | 23.2 | 8.9 | 2.9 |

(2) A 2-liter autoclave was continuously charged hourly with 1 liter of hexane, 0.5 millimols of triisobutyl aluminum and 0.0025 millimols, calculated as the titanium atom, of the catalyst component prepared above, and at 80° C. 300 g/hour of ethylene was introduced while controlling hydrogen so as to provide a melt index of 4 to 6. The polymerization was performed continuously for 2 weeks. The operation could be performed smoothly while yielding the polymer in an amount of 270 g to 295 g per hour. After the end of polymerization, the autoclave was inspected, but no trouble such as the formation of an agglomerated mass or films detrimental to continuous polymerization was observed.

EXAMPLE 2

In the catalyst preparation set forth in Example 1, 2 mols of titanium tetrachloride, was added instead of 5 mols of the titanium tetrachloride, to form a catalyst in the same way.

A 1-liter autoclave was charged hourly with 1 liter of kerosene, 1 mmol or triisobutyl aluminum hydride and 0.001 mmol, calculated as the titanium atom, of the catalyst, and 150 g/hour of ethylene was fed at 160° C. Hydrogen was continuously introduced into the autoclave so as to provide polyethylene having a viscosity average molcular weight of 3000 to 3600 to form 120 g of polymer on an average per hour. The total pressure of the polymerization system was 30 Kg/cm$^2$. The specific activity corresponded to a polyethylene was yielded amount of 120,000 g per mmol of titanium per hour.

EXAMPLE 3

Catalysts were prepared in the same way as in Example 1 except varying the types of alcohol and alkylaluminum, and the polymerization of ethylene was performed in the same way as in Example 1. The results are shown in Table 1. The table also contains the results of Comparative Examples 1 to 5 which were performed by using the conditions which did not come within the scope of this invention.

EXAMPLE 4

One mol of commercially available anhydrous magnesium dichloride was suspended in 1 liter of kerosene, and a predetermined amount of each of the alcohols shown in Table 2 was added to the suspension at 20° C. The mixture was stirred for one hour, and a predetermined amount of each of the organometallic compounds shown in Table 2 was added dropwise at 25° C., followed by stirring for one hour. Either a titanium or vanadium compound was added to the mixture, and the mixture was stirred for 2 hours at 80° C. After the reaction, the reaction product was washed several times with kerosene.

A 2-liter autoclave was charged with 1 liter of kerosene, 1 mmol of an alkyl aluminum, and 0.0025 mmol, calculated as the transition metal atom, of the above prepared transition metal catalyst component, and the system was heated to 80° C. Hydrogen was introduced into the autoclave to a pressure of 3 Kg/cm$^2$. Ethylene was fed so as to maintain the total pressure at 7 Kg/cm$^2$, and the polymerization of ethylene was performed for 0.5 hour.

The results obtained are shown in Table 2. The table also shows the results of Comparative Examples 6 to 10 which were performed under conditions outside the scope of the present invention.

Table 1

| Run Nos. | Carrier Type | Carrier Amount (mol) | Alcohol Type | Alcohol Amount (mol) | Organometallic compound Type | Organometallic compound Amount (mol) | Transition metal titanium compound Type | Transition metal titanium compound Amount (mol) |
|---|---|---|---|---|---|---|---|---|
| 1 | MgCl$_2$ | 10 | C$_2$H$_5$OH | 40 | Et$_2$AlCl | 19 | TiCl$_4$ | 3.5 |
| 2 | " | 10 | CH$_3$OH | 50 | Et$_{1.5}$AlCl$_{1.5}$ | 32 | " | 2 |
| 3 | " | 10 | n-BuOH | 50 | Et$_3$Al | 17 | TiBr$_4$ | 1 |
| 4 | " | 10 | C$_2$H$_5$OH | 60 | Et$_2$Al(OEt) | 30 | TiCl$_4$ | 2 |
| Comparative Example | | | | | | | | |
| 1 | MgCl$_2$ | 10 | None | — | Et$_2$AlCl | 19 | TiCl$_4$ | 3.5 |
| 2 | CaIO$_3$ | 10 | " | — | " | 19 | " | 3.5 |
| 3 | Mg(OH)Cl | 10 | " | — | " | 19 | " | 3.5 |
| 4 | Mg(OEt)$_2$ | 10 | " | — | " | 19 | " | 3.5 |
| 5 | MgCl$_2$ | 10 | C$_2$H$_5$OH | 60 | None | — | " | 3.5 |

| Run Nos. | Yielded amount of polyethylene (g/g Ti.hr. ethylene atm) | Melt index | Apparent density (g/cm$^3$) | Suitability of continuous polymerization |
|---|---|---|---|---|
| 1 | 243,000 | 5.6 | 0.30 | Operable for one week without trouble |
| 2 | 210,000 | 6.1 | 0.31 | " |
| 3 | 193,000 | 5.7 | 0.30 | " |
| 4 | 181,000 | 5.8 | 0.31 | " |
| Comparative Example | | | | |
| 1 | 1,320 | 0.25 | 0.18 | Because of low apparent density the discharge and transfer of polymer become impossible, and continuous polymerization fails within 6 hours. |
| 2 | 760 | 0.15 | 0.10 | |
| 3 | 1,020 | 0.10 | 0.08 | |
| 4 | 1,560 | 0.21 | 0.15 | |
| 5 | 1,110 | 0.05 | 0.08 | |

Table 2

| Run Nos. | | 6 | 7 | 8 |
|---|---|---|---|---|
| Carrier | | MgCl$_2$ 1 mol | MgCl$_2$ 1 mol | MgCl$_2$ 1 mol |
| Alcohol | Type | C$_2$H$_5$OH | C$_2$H$_5$OH | C$_2$H$_5$OH |
| | Amount (mol) | 6 | 5 | 4 |
| Organo-metallic compound | Type | Et$_2$AlCl | C$_2$H$_5$MgCl | EtAl(OEt)Cl |
| | Amount (mol) | 2.7 | 4 | 4 |
| Titanium or Vanadium compound | Type | TiCl$_4$ | Ti(OEt)Cl$_3$ | TiCl$_4$ |
| | Amount (mol) | 0.5 | 0.8 | 0.5 |
| Amount of Ti or | | 48 | 55 | 58 |

Table 2-continued

| | | | | |
|---|---|---|---|---|
| V contained in the solid portion (mg/g) | | | | |
| Amount of Cl contained in the solid portion (mg/g) | | 524 | 507 | 511 |
| Organometallic compound | | iBu$_3$Al | Et$_{2.5}$Al(OnBu)$_{0.5}$ | Et$_2$AlH |
| Specific activity (g polymer/ g. Ti(V).hr.C"$_2$ atm) | | 315,800 | 278,300 | 259,100 |
| M.I. | | 5.86 | 4.26 | 5.55 |
| A.D. | | 0.34 | 0.32 | 0.30 |
| Particle size distribution of polymer | Greater than 40 mesh (wt.%) | 2.3 | 2.6 | 2.3 |
| | Smaller than 200 mesh (wt.%) | 3.8 | 2.9 | 3.3 |

| Run Nos. | | 9 | 10 | Comparative Example 6 |
|---|---|---|---|---|
| Carrier | | MgCl$_2$ 1 mol | MgCl$_2$ 1 mol | MgO 1 mol |
| Alcohol | Type | C$_2$H$_5$OH | HOCH$_2$CH$_2$OH | — |
| | Amount (mol) | 6 | 3 | — |
| Organometallic compound | Type | (Et$_2$Al)$_2$SO$_4$ | EtAlCl$_2$ | Et$_2$AlCl |
| | Amount (mol) | 2.5 | 2.5 | 2.7 |
| Titanium or Vanadium compound | Type | TiCl$_4$ / VCl$_4$ | Ti(OnBu)Cl$_3$ | TiCl$_4$ |
| | Amount (mol) | 0.5 / 0.2 | 0.5 | 0.5 |
| Amount of Ti or V contained in the solid portion (mg/g) | | Ti 45 V 21 | 41 | — |
| Amount of Cl contained in the solid portion (mg/g) | | 581 | 556 | — |
| Organometallic compound | | Et$_3$Al | Et$_3$Al | Et$_3$Al |
| Specific activity (g polymer/ g. Ti(V).hr.C"$_2$ atm) | | 108,000 | 129,600 | 590 |
| M.I. | | 3.15 | 4.51 | 0.11 |
| A.D. | | 0.31 | 0.31 | 0.12 |
| Particle size distribution of polymer | Greater than 40 mesh (wt.%) | 1.9 | 2.8 | 58.0 |
| | Smaller than 200 mesh (wt.%) | 2.7 | 2.6 | 0.5 |

| Run Nos. | | Comparative Example 7 | Comparative Example 8 | Comparative Example 9* |
|---|---|---|---|---|
| Carrier | | MgCl$_2$ 1 mol | Mg(oiC$_4$H$_9$)$_2$ 1 mol | Mg(OEt)$_2$ 1 mol |
| Alcohol | Type | C$_2$H$_5$OH | None | None |
| | Amount (mol) | 2 | — | — |
| Organometallic compound | Type | None | Et$_2$AlCl | Et$_2$AlCl |
| | Amount (mol) | — | 2.7 | 2.7 |
| Titanium or Vanadium compound | Type | TiCl$_4$ | TiCl$_4$ | TiCl$_4$ |
| | Amount (mol) | 1.8 | 0.5 | 40 |
| Amount of Ti or V contained in the solid portion (mg/g) | | 37 | — | 51 |
| Amount of Cl contained in the solid portion (mg/g) | | 638 | — | 662 |
| Organometallic compound | | Et$_3$Al | Et$_3$Al | Et$_3$Al |
| Specific activity (g polymer/ g.Ti(V).hr.C"$_2$ atm) | | 53,000 | 1,130 | 28,300 |
| M.I. | | 1.33 | 0.09 | 0.85 |
| A.D. | | 0.28 | 0.08 | 0.12 |

Table 2-continued

| | | | | |
|---|---|---|---|---|
| Particle size distribution (wt.%) of polymer | Greater than 40 mesh | 50.3 | 24.7 | 18.2 |
| | Smaller than 200 mesh (wt.%) | 2.5 | 4.1 | 25.3 |

| Run No. | | Comparative Example 10** |
|---|---|---|
| Carrier | | $MgCl_2$ 1 mol |
| Alcohol | Type | None |
| | Amount (mol) | — |
| Organo-metallic compound | Type | $Et_3Al$ |
| | Amount (mol) | $4 \times 10^{-3}$ |
| Titanium or Vanadium compound | Type | $TiCl_4$ |
| | Amount (mol) | 0.1 |
| Amount of Ti or V contained in the solid portion (mg/g) | | 10 |
| Amount of Cl contained in the solid portion (mg/g) | | 770 |
| Organometallic compound | | $Et_3Al$ |
| Specific activity (g polymer/ g.Ti(V).hr.C"$_2$ atm) | | 450 |
| M.I. | | 0.03 |
| A.D. | | 0.08 |
| Particle size distribution (wt.%) of polymer | Greater than 40 mesh | 42.1 |
| | Smaller than 200 mesh (wt.%) | 0.9 |

*There was used a titanium component which was prepared by filtering the solid product obtained by reaction with $Et_2AlCl$, washing the filtrate sufficiently with hexane, drying the product for 20 hours at 60° C. and 1 mmHg, and reacting the dried product with $TiCl_4$ at 130° C.

**There was used a titanium component which was prepared by using $Et_3Al$ instead of $Et_2AlCl$ in Comparative Example 1, reacting the reaction product further with $TiCl_4$, removing excessive $TiCl_4$ at reduced pressure at 150° C., and heating the resulting product for 3 hours at 300° C. and 1 mmHg.

There was used a titanium component which was prepared by filtering the solid product obtained by reaction with $Et_2AlCl$, washing the filtrate sufficiently with hexane, drying the product for 20 hours at 60° C. and 1 mmHg, and reacting the dried product with $TiCl_4$ at 130° C.

There was used a titanium component which was prepared by using $Et_3Al$ instead of $Et_2AlCl$ in Comparative Example 1, reacting the reaction product further with $TiCl_4$, removing excessive $TiCl_4$ at reduced pressure at 150° C., and heating the resulting product for 3 hours at 300° C. and 1 mmHg.

EXAMPLE 5

A 2-liter autoclave was continuously charged hourly with 1 liter of hexane, 0.3 mmol of triethyl aluminum, 0.03 mol, calculated as the titanium atom, of the titanium catalyst component prepared in Example 1, and 220 g of ethylene containing 5% by volume of butadiene at a temperature of 80° C. Hydrogen was fed into the autoclave so a to provide polymers having a melt index of 5 or 6. The polymerization proceeded smoothly for 3 days. There was obtained a butadiene-/ethylene copolylmer in a yield of 200 to 210 g per hour. The copolymer had an apparent density of 0.300 g/cm³, and a melt index of 5.13. The specific activity was 70,000 g polymer/g Ti hr. The polymer contained 18.8 trans double bonds per 1000 carbon atoms.

EXAMPLE 6

To 1 liter of kerosene were added 0.0035 mmol, calculated as the titanium atom, of the titanium catalyst component prepared in Example 4, Run No. 6 and 0.5 mmol of triethyl aluminum. Hydrogen was introduced into the autoclave to a pressure of 3 Kg/cm². Ethylene gas containing 0.5% by volume of n-butene-1 was continuously fed to a total pressure of 7 Kg/cm², and polymerized for one hour to afford 176 g of polyethylene having a melt index of 7.9 and an apparent density of 0.32 and containing 2 ethyl groups per 1000 carbon atoms. The specific activity was 50,300 g polymer/m MTi.hr, which corresponded to 251,400 g polymer/g Ti.hr C"$_2$ atm. The particle size distribution was as follows:

| Particle size (mesh) | Larger than 42 | 42–60 | 60–100 | 100–150 | 150–200 | Smaller than 200 |
|---|---|---|---|---|---|---|
| Distribution (% by weight) | 5.1 | 6.7 | 51.5 | 26.0 | 7.0 | 3.7 |

EXAMPLE 7

One mol of anhydrous magnesium dichloride was suspended in 1 liter of toluene, and 4 mols of each of the alcohols indicated in Table 3 as added at 40° C., followed by stirring the mixture for 3 hours. Then, each of the organometallic compounds shown in Table 3 was added dropwise, and the mixture was stirred for 2 hours. Then titanium tetrachloride was added, and the mixture was stirred for 2 hours at 120° C. After the reaction, the reaction product was washed several times with toluene.

A 2-liter glass vessel was charged with 1 liter of kerosene, each of the organoaluminum compounds shown in Table 3, and 0.01 millimol, calculated as the titanium atom, of the above-mentioned titanium catalyst component, and the mixture was heated to 90° C. Ethylene gas was introduced at atmospheric pressure, and polymerized for 30 minutes. The results obtained are shown in Table 3.

Table 4

| Runs Nos. | Carrier Type | Carrier Mol | Alcohol Type | Alcohol Mol | Organo-metallic compound Type | Organo-metallic compound Mol | Titanium compound Type | Titanium compound Mol | Organo-aluminum compound Type | Organo-aluminum compound Mol | Yielded amount of poly-ethylene | Catalytic activity (g of poly-ethylene g Ti.Hr. $C''_2$ atm) | Molecular weight |
|---|---|---|---|---|---|---|---|---|---|---|---|---|---|
| 1 | $MgCl_2$ | 1 | $CH_2=CHCH_2OH$ | 4 | $iBu_2AlH$ | 1.3 | $TiCl_4$ | 0.5 | $iBu_2AlH$ | 1 | 34 | 136,000 | 410,000 |
| 2 | $MgCl_2$ | 1 | 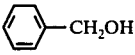 | 4 | $Et_2AlF$ | 0.9 | $TiCl_4$ | 0.5 | $Et_3Al$ | 1 | 23 | 92,000 | 390,000 |

What we claim is:

1. A process for polymerizing or copolymerizing olefins in the presence of a catalyst consisting essentially of the reaction product of:

A. a transition metal catalyst component prepared by reacting (1) a titanium or vanadium compound selected from the group consisting of compounds of the formula $TiX_4$ wherein X is a halogen atom, compounds of the formula $Ti(OR)_{4-n}X_n$ wherein X is the same as defined above, R is an alkyl group, and n is zero or a positive number of less than 4, compounds of the formula $VOX_3$ wherein X is the same as defined above, and compounds of the formula $VX_4$ wherein X is the same as defined above, with (2) the product formed by a reaction at from −20° to +100° C between (a) 1 mol of a magnesium dihalide solid carrier comprising an adduct formed by reacting at a temperature of from −10° to +200° C;
(aa) a magnesium dihalide; with
(ab) an aliphatic or aromatic alcohol having from 1 to 12 carbon atoms, present in an amount of from 0.1 to 10 mols per mol of magnesium dihalide; and (b) an organometallic compound of a metal of Groups I to III of the periodic table selected from the group consisting of compounds of the formula RM wherein R is an alkyl or aryl group, and M is lithium, sodium or potassium, compounds of the formula $R_2M'$ wherein R is the same as defined above and M' is zinc or cadmium, compounds of the formula $R_{2-l}MgX_l$ wherein R is the same as defined above, X is a halogen atom and $l$ is 0 or 1, compounds of the formula $MAlR_4$ wherein R and M are the same as defined above, compounds of the formula $R'_{3-m}AlX_m$ wherein R' is a hydrogen atom, or an alkyl or aryl group, X is the same as defined above, and m is zero or a positive number of not greater than 3, compounds of the formula $R'_{3-n}(OR)_n$ wherein R' is the same as defined above, and n is a positive number greater than 0 but not greater than 3, and compounds of the formula RAl(OR)X wherein R and M are the same as defined above, wherein the organometallic compound (A)(2)(b) is reacted with the magnesium dihalide solid carrier (A)(2)(a) in an amount such that the amount of the organic groups, R and R', of the organometallic compound is 0.1 to 1.5 mols per mol of the alcoholic hydroxy group of the adduct; and (B) an organometallic compound catalyst component of a metal of Groups I to III of the periodic table selected from the group consisting of compounds of the formula $R'_{3-m}AlX_m$ wherein R' is a hydrogen atom, an alkyl or aryl group, X is a halogen atom, and m is 0 or a positive number not greater than 3, compounds of the formula $R'_{3-n}Al(OR)_n$ wherein R' is the same as mentioned above, and n is a positive number greater than 0 but not greater than 3, compounds of the formula RAl(OR)X wherein R and X are the same as defined above, compounds of the formula $R_{2-l}MgX_l$ wherein R and X are the same as defined above and $l$ is 0 or 1, and dialkyl zincs wherein the amount of the organometallic compound (B) is 1 to 10,000 mols per mol of the titanium or vanadium atom of the titanium or vanadium compound (A)(1).

2. The process according to claim 1 wherein the reaction product (A)(2) is formed by the reaction of (a) 1 mol of said magnesium dihalide solid carrier and (b) at least 0.1 mol of said organometallic compound.

3. The process according to the claim 2 wherein the molar ratio of the organometallic compound (A)(2)(b) to the titanium or vanadium compound (A)(1) is 1:0.1 to 10.

4. The process according to claim 3 wherein the molar ratio of the organometallic compound (A)(2)(b) to the titanium or vanadium compound (A)(1) is 1:0.1 to 5.

5. The process according to claim 2 wherein the reaction product (A)(2) is formed by the reaction of (a) 1 mol of said magnesium dihalide solid carrier and (b) from 0.1 to 10 mols of said organometallic compound.

6. The process of claim 1 wherein the olefin is ethylene or mixture of ethylene and α-olefin and/or diolefin.

7. The process of claim 3 wherein said magnesiun dihalide is magnesium dichloride.

8. The process of claim 1 wherein said polymerization or copolymerization is carried out at a temperature of 20° to 200° C and a pressure of 1 to 100 Kg/cm².

9. The process of claim 1 wherein said polymerization or copolymerization is carried out in an inert organic liquid medium.

10. The process of claim 9 wherein the amount of said transition metal component (A) is 0.001 to 1000 millimols, calculated as the titanium or vanadium atom, per liter of the inert organic liquid medium.

* * * * *

UNITED STATES PATENT AND TRADEMARK OFFICE
CERTIFICATE OF CORRECTION

PATENT NO. : 4,071,674
DATED : January 31, 1978
INVENTOR(S) : Kashiwa, et al.

It is certified that error appears in the above–identified patent and that said Letters Patent are hereby corrected as shown below:

Claim 1, column 15, line 66, delete "$R_{2-\ell}MgX_\ell$", insert --$R_{2\ell}MgX_\ell$--.

Claim 1, column 16, line 6, delete "$R'_{3-n}(OR)_n$", insert --$R'_{3-n}Al(OR)_n$--.

Signed and Sealed this

Twentieth Day of June 1978

[SEAL]

Attest:

RUTH C. MASON
*Attesting Officer*

DONALD W. BANNER
*Commissioner of Patents and Trademarks*